June 6, 1933.   J. Y. LAMBERT   1,912,714
ANTISKID DEVICE FOR VEHICLE WHEELS
Filed Feb. 4, 1929
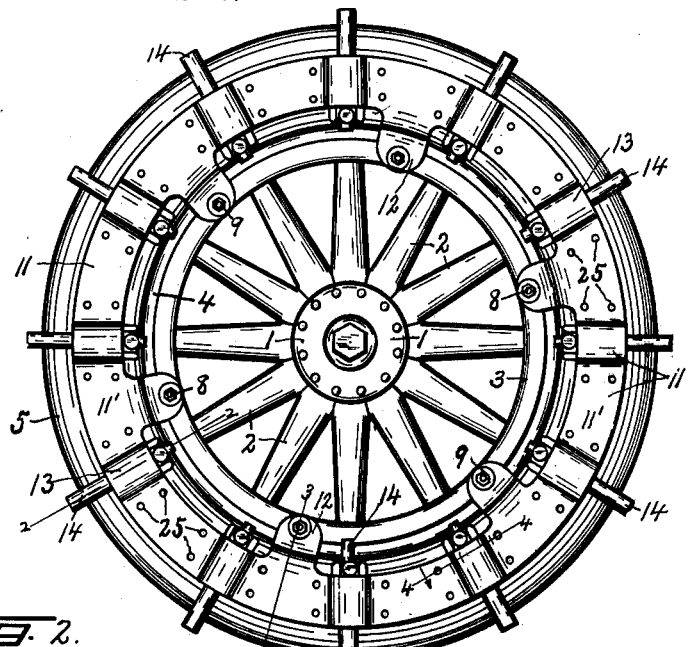
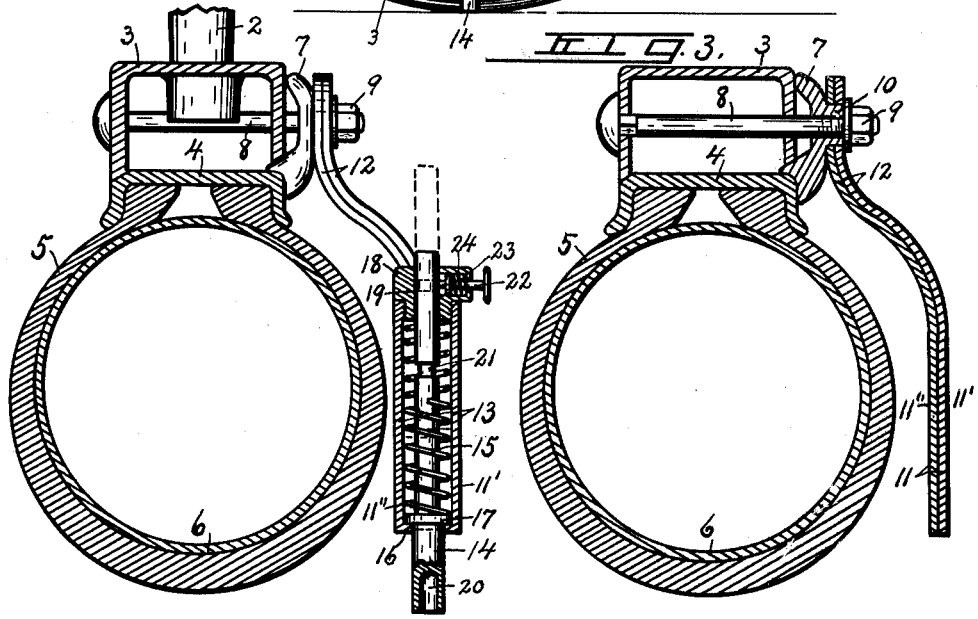
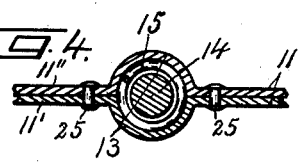

Patented June 6, 1933

1,912,714

UNITED STATES PATENT OFFICE

JOHN Y. LAMBERT, OF SYRACUSE, NEW YORK

ANTISKID DEVICE FOR VEHICLE WHEELS

Application filed February 4, 1929. Serial No. 337,409.

This invention relates to an antiskid device for vehicle wheels and more particularly to that type of wheel having a demountable rim and a pneumatic tire which is more or less subject to deflation by leakage of air therefrom.

I am aware that wheels of this type have been provided with various types of antiskid devices adapted to increase traction and to prevent circumferential slipping and while the present invention serves the same purpose its main object is to prevent the more dangerous side slipping or skidding and also to support the wheel in rolling contact with the pavement in case the pneumatic tire should become deflated thus permitting the vehicle to be safely propelled to its destination or to a service station without further injury to the tire or other parts of the wheel.

One of the specific objects is to enable the anti-skid device to be easily and quickly applied to the outer end of the wheel without necessitating the jacking up of the wheel from the ground.

A further object is to secure the anti-skid device to the wheel by the same lug bolts used for holding the rim upon the felloe.

Another object is to provide the anti-skid device with resilient ground-engaging members normally projecting beyond the tread of the tire and adapted to yield under the weight of the machine when contacting with the ground or pavement to reduce to a minimum vertical vibration of the wheel when rolling over the surface of the ground.

Another object is to provide means for locking the ground-engaging members in their innermost positions within the plane of contact of the tread of the tire with the ground so as to reduce wear upon said members when the functioning of the anti-skid device is not required, as, for example, on dry pavements or under safe road contact of the tires.

Other objects and uses relating to specific parts of the device will be brought out in the following description.

In the drawing:

Figure 1 is an outer end view of a vehicle wheel and my improved anti-skid device mounted thereon.

Figures 2 and 3 are enlarged transverse sectional views taken respectively on lines 2—2 and 3—3, Figure 1.

Figure 4 is an enlarged detail sectional view taken in the plane of line 4—4, Figure 1.

In order that the invention may be clearly understood I have shown a vehicle wheel comprising a hub —1—, spokes —2—, a felloe —3— and a demountable rim —4— upon which is mounted the usual tire shoe or casing —5— containing an inner inflatable tube —6— of conventional construction adapted to be inflated by air.

The rim —4— is held in operative position upon the felloe —3— by the conventional form of lugs —7— and bolts —8—, the outer ends of which are threaded and engaged by suitable nuts 9 as shown in Figures 2 and 3 for tightening the lugs to secure the rim in place or loosening the lugs —7— to permit the rim —4— to be removed from the tire when desired.

These lug bolts —8— are utilized as a part of the means for securing the antiskid device in operative position and for this purpose are provided with reduced annular bearings 10 adapted to enter corresponding openings in the anti-skid device so that by removing the nuts —9— the anti-skid device may be easily and quickly placed in operative position or removed when desired.

As illustrated, this anti-skid device comprises a ring —11— having its periphery circular and of slightly less diameter than that of the tread of the tire, the radial depth of the major portion of the ring being somewhat less than the corresponding radial depth of the tire.

This ring is provided with a plurality of inwardly radially projecting ears —12— arranged in uniformly spaced relation circumferentially corresponding to the circumferential spacing of the lugs —7— and bolts —8— and provided near their inner ends with apertures —13— for receiving the bosses or bearings —10— of the lugs —7— when the anti-skid device is placed in operative position upon the wheel.

In order that the ring —11— may be supported in a substantially vertical plane in spaced relation to the outer side face of the tire shoe —5— parallel with the longitudinal center of the tire and rim the ears —12— are bent or deflected laterally toward the felloe and rim so that their inner ends are disposed in a vertical plane parallel with but some distance inwardly from the plane of the main body of the ring —11— for securement to the bearings or bosses —10— which project outwardly from the larger portions of the lugs —7— as shown clearly in Figure 3.

When the ears —12— are secured to the lugs —7— the ring —11— will extend across the major portion of the outer side face of the tire shoe —5— in spaced relation thereto as shown clearly in Figure 3 so as to allow a reasonable amount of lateral deflection of the tire under load or in passing over obstructions without frictional engagement therewith.

The ring —11— is provided with a series of radial guides —13— in the form of tubular sockets arranged in uniformly spaced relation circumferentially and preferably in pairs between the ears —12— for receiving a corresponding number of radial ground-engaging members —14— which are slidable in the guides —13— and are spring-pressed outwardly by coiled springs —15— as shown in Figures 2 and 4.

The outer ends of the tubular guides —13— are provided with inturned annular flanges or shoulders —16— cooperating with annular flanges —17— on the ground-engaging members —14— for limiting the outward movement of said members.

The inner ends of the tubular guides —13— are provided with bushings —18— tightly fitted therein and provided with central radial openings —19— for receiving the inner ends of the ground-engaging members —14— which, it will be seen upon reference to Figure 2, are guided in their reciprocatory movements in the outer and inner ends of the guides.

The coiled springs —15— are enclosed within the tubular guides —13— around the corresponding ground-engaging members —14— with their outer ends bearing against the shoulders —17— and their inner ends engaged with the bushings —18— for the purpose of yieldingly holding the ground-engaging members in their outermost positions.

The outer ends of the ground-engaging members —14— normally extend relatively short distances beyond the tread of the tire shoe and are preferably cup-shaped in that they are provided with sockets —20— extending inwardly from their outer ends to afford a better grip upon icy or slippery pavements in all directions and thereby to not only increase the traction of the wheels but also to reduce the liability of slipping circumferentially or laterally upon the pavement.

These cup-shaped outer ends of the ground-engaging members reduce the area of contact with the ground and incidentally assures more certain penetration of the surface of the ice or other slippery pavement.

As previously stated, the outer peripheral edge of the ring —11— is some distance within the periphery of the tire shoe —5— while the ground-engaging members —14— normally extend a short distance beyond the tread of the tire to assure engagement with the ground as the wheel travels along the surface thereof.

Provision is made for holding the ground-engaging members within the periphery of the tire shoe or out of contact with the ground, particularly when the vehicle is traveling over dry or safe pavements and for this purpose the intermediate portion of each ground-engaging member —14— within the socket —13— is provided with an annular groove —21— adapted to receive the inner end of a pull rod —22— which is slidable radially of the ground-engaging member —14— in a suitable opening —23— in the outer side of the bushing —18—, Figure 2, said rod being spring-pressed inwardly by a coiled spring —24— within the opening —23— so that when the member —14— is moved inwardly a sufficient distance to register its annular groove —21— with the inner end of the locking bolt or rod —22— the latter will be forced into the annular groove —21— by the spring —24— thereby holding the member —14— against outward movement by its actuating spring —15— as shown by dotted lines in Figure 2.

On the other hand, when it is desired to use the ground-engaging members —14— the locking bolt —22— will be withdrawn from the groove —21— against the action of the spring —24— thereby allowing the spring —15— to force the member —14— to its ground-engaging position, as shown by full lines in Figure 2.

For convenience and economy of manufacture of the ring —11— with the sockets —13— therein, said ring is preferably made of two similar sheet metal sections —11'— and —11"— firmly secured face to face to each other by rivets —25— or equivalent fastening means, Figure 1, thus forming a substantially unitary structure in which portions of the two sections are pressed in opposite directions to form sockets, one of which is clearly shown in Figure 4.

One reason for making the periphery of the ring —11— circular and concentric with the axis of the wheel is that it may be used to partially support the vehicle in case the tire should become deflated in which event the wheel would simply roll along the pavement upon the periphery of the ring thereby preventing further injury to the tire and assuring the safe transportation of the driver to his destination or other service station where suitable repairs to the tire may be made.

The construction shown and described is particularly simple, practical and efficient, but it is obvious that various changes may be made in the structural details without departing from the spirit of the invention.

What I claim is:—

In an anti-skid device for vehicle wheels having a felloe and a tire, a ring comprising two annular sheet metal sections having sockets pressed in opposite directions to form circumferentially spaced radial guides, means for fastening said ring to the felloe to support the same across the adjacent face of the tire co-axial therewith, ground-engaging members slidable radially in said guides and normally spring-pressed outwardly to cause their outer ends to engage the ground, each guide and its corresponding ground-engaging member being provided with cooperative stops so positioned that they will engage for holding said member in its inoperative position against the action of said spring and be out of engagement when the member is in the operative or ground-engaging position to permit the sliding movement of said member.

In witness whereof I have hereunto set my hand this 30th day of January 1929.

JOHN Y. LAMBERT.